US011706011B2

(12) United States Patent
Mondet et al.

(10) Patent No.: US 11,706,011 B2
(45) Date of Patent: Jul. 18, 2023

(54) MEDIUM ACCESS CONTROL (MAC) CONTROL ELEMENT FOR UPDATING CONFIGURATIONS FOR PERIODIC PATTERNS

(71) Applicant: QUALCOMM Incorporated, San Diego, CA (US)

(72) Inventors: Mickael Mondet, Louannec (FR); Prashanth Haridas Hande, San Diego, CA (US); Peerapol Tinnakornsrisuphap, San Diego, CA (US); Ravi Agarwal, San Diego, CA (US); Hyun Yong Lee, San Diego, CA (US); Chih-Ping Li, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/394,027

(22) Filed: Aug. 4, 2021

(65) Prior Publication Data
US 2023/0042286 A1    Feb. 9, 2023

(51) Int. Cl.
*H04L 5/00* (2006.01)

(52) U.S. Cl.
CPC .................................. *H04L 5/0085* (2013.01)

(58) Field of Classification Search
CPC ..... H04L 5/0085; H04L 45/123; H04L 27/00; H04B 7/01; H04W 24/10; H04W 72/042
See application file for complete search history.

(56) References Cited

U.S. PATENT DOCUMENTS

| 2017/0265182 | A1* | 9/2017 | Guo .................. H04W 72/0413 |
| 2018/0103460 | A1* | 4/2018 | Sharma ................. H04W 76/27 |
| 2018/0324889 | A1* | 11/2018 | Babaei ..................... H04W 8/26 |
| 2020/0186232 | A1* | 6/2020 | Levitsky .............. H04B 7/0617 |
| 2020/0374728 | A1* | 11/2020 | Manolakos ....... H04W 72/1284 |
| 2021/0051613 | A1* | 2/2021 | Tang ................... H04W 56/001 |
| 2021/0400567 | A1* | 12/2021 | Sha ........................ H04W 48/16 |

* cited by examiner

*Primary Examiner* — Shukri Taha
(74) *Attorney, Agent, or Firm* — Seyfarth Shaw LLP

(57) ABSTRACT

A method of wireless communication, by a user equipment (UE), includes receiving, from a base station, a medium access control-control element (MAC-CE) including an offset change command. The method also includes adjusting an offset within a periodic pattern based on the offset change command. A method of wireless communication, by a base station, includes detecting a misalignment between an arrival time of data relative to a periodic pattern. The method also includes transmitting, to a user equipment (UE), a medium access control-control element (MAC-CE) including an offset change command to adjust an offset within the periodic pattern.

30 Claims, 16 Drawing Sheets

| Radio Index in MAC-CE | Radio Resource to be activated |
|---|---|
| 0 | 'radioRes0' |
| 1 | 'radioRes1' |
| 2 | 'radioRes2' |
| 3 | 'radioRes3' |
| 4 | 'radioRes4' |

*FIG. 9*

| Index In MAC-CE | Number of slots to be applied to the offset |
|---|---|
| 0 | 0 |
| 1 | -5 |
| 2 | +5 |
| 'f' | Next 'U' slot |
| 'b' | Previous 'U' slot |

*FIG. 10*

Table 6.2.1-1 Values of LCID for DL-SCH

| Codepoint/Index | LCID values |
|---|---|
| 0 | CCCH |
| 1–32 | Identity of the logical channel |
| 33 | Extended logical channel ID field (two-octet eLCID field) |
| 34 | Extended logical channel ID field (one-octet eLCID field) |
| 35–46 | Reserved |
| 47 | Recommended bit rate |
| 48 | SP ZP CSI-RS Resource Set Activation/Deactivation |
| 49 | PUCCH spatial relation Activation/Deactivation |
| 50 | SP SRS Activation/Deactivation |
| 51 | SP CSI reporting on PUCCH Activation/Deactivation |
| 52 | TCI State Indication for UE-specific PDCCH |
| 53 | TCI States Activation/Deactivation for UE-specific PDSCH |
| 54 | Aperiodic CSI Trigger State Subselection |
| 55 | SP CSI-RS/CSI-IM Resource Set Activation/Deactivation |
| 56 | Duplication Activation/Deactivation |
| 57 | SCell Activation/Deactivation (four octets) |
| 58 | SCell Activation/Deactivation (one octet) |
| 59 | Long DRX Command |
| 60 | DRX Command |
| 61 | Timing Advance Command |
| 62 | UE Contention Resolution Identity |
| 63 | Padding |

*FIG. 11A*

Table 6.2.1-1b Values of one-octet eLCID for DL-SCH

| Codepoint | Index | LCID values |
|---|---|---|
| 0 to 244 | 64 to 308 | Reserved |
| 245 | 309 | Serving Cell Set based SRS Spatial Relation Indication |
| 246 | 310 | PUSCH Pathloss Reference RS Update |
| 247 | 311 | SRS Pathloss Reference RS Update |
| 248 | 312 | Enhanced SP/AP SRS Spatial Relation Indication |
| 249 | 313 | Enhanced PUCCH Spatial Relation Activation/Deactivation |
| 250 | 314 | Enhanced TCI States Activation/Deactivation for UE-specific PDSCH |
| 251 | 315 | Duplication RLC Activation/Deactivation |
| 252 | 316 | Absolute Timing Advance Command |
| 253 | 317 | SP Positioning SRS Activation/Deactivation |
| 254 | 318 | Provided Guard Symbols |
| 255 | 319 | Timing Delta |

*FIG. 11B*

Table 6.2.1-2 Values of LCID for UL-SCH

| Codepoint/Index | LCID values |
|---|---|
| 0 | CCCH of size 64 bits (referred to as "CCCH1" in TS 38.331 [5]) |
| 1-32 | Identity of the logical channel |
| 33 | Extended logical channel ID field (two-octet eLCID field) |
| 34 | Extended logical channel ID field (one-octet eLCID field) |
| 35-44 | Reserved |
| 45 | Truncated Sidelink BSR |
| 46 | Sidelink BSR |
| 47 | Reserved |
| 48 | LBT failure (four octets) |
| 49 | LBT failure (one octet) |
| 50 | BFR (one octet $C_i$) |
| 51 | Truncated BFR (one octet $C_i$) |
| 52 | CCCH of size 48 bits (referred to as "CCCH" in TS 38.331 [5]) |
| 53 | Recommended bit rate query |
| 54 | Multiple Entry PHR (four octets $C_i$) |
| 55 | Configured Grant Confirmation |
| 56 | Multiple Entry PHR (one octet $C_i$) |
| 57 | Single Entry PHR |
| 58 | C-RNTI |
| 59 | Short Truncated BSR |
| 60 | Long Truncated BSR |
| 61 | Short BSR |
| 62 | Long BSR |
| 63 | Padding |

*FIG. 14A*

Table 6.2.1-2b Values of one-octet eLCID for UL-SCH

| Codepoint | Index | LCID values |
|---|---|---|
| 0 to 249 | 64 to 313 | Reserved |
| 250 | 314 | BFR (four octets $C_i$) |
| 251 | 315 | Truncated BFR (four octets $C_i$) |
| 252 | 316 | Multiple Entry Configured Grant Confirmation |
| 253 | 317 | Sidelink Configured Grant Confirmation |
| 254 | 318 | Desired Guard Symbols |
| 255 | 319 | Pre-emptive BSR |

*FIG. 14B*

MEDIUM ACCESS CONTROL (MAC) CONTROL ELEMENT FOR UPDATING CONFIGURATIONS FOR PERIODIC PATTERNS

FIELD OF THE DISCLOSURE

The present disclosure relates generally to wireless communications, and more specifically to employing medium access control (MAC) control elements for controlling an offset and radio resources of a periodic pattern.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP). Narrowband (NB)-Internet of things (IoT) and enhanced machine-type communications (eMTC) are a set of enhancements to LTE for machine type communications.

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, an evolved Node B (eNB), a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

SUMMARY

In aspects of the present disclosure, a method of wireless communication, by a user equipment (UE), includes receiving, from a base station, a medium access control-control element (MAC-CE) including an offset change command. The method also includes adjusting an offset within a periodic pattern based on the offset change command.

In other aspects of the present disclosure, a method of wireless communication, by a base station, includes detecting a misalignment between an arrival time of data relative to a periodic pattern. The method also includes transmitting, to a user equipment (UE), a medium access control-control element (MAC-CE) including an offset change command to adjust an offset within the periodic pattern.

Aspects generally include a method, apparatus, system, computer program product, non-transitory computer-readable medium, user equipment, base station, wireless communications device, and processing system as substantially described with reference to and as illustrated by the accompanying drawings and specification.

Aspects also relate to an apparatus of a UE for wireless communication, comprising a memory and at least one processor coupled to the memory. The processor(s) and memory are configured to receive, from a base station, a medium access control-control element (MAC-CE) including an offset change command. The processor(s) and memory are also configured to adjust an offset within a periodic pattern based on the offset change command.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

FIG. 9 is a table showing indexes for activating radio resources of a periodic pattern, in accordance with aspects of the present disclosure.

FIG. 10 is a table showing indexes for applying an offset for a periodic pattern, in accordance with aspects of the present disclosure.

FIGS. 11A and 11B are tables illustrating medium access control-control element (MAC-CE) definitions for an offset change command, in accordance with aspects of the present disclosure.

FIGS. 14A and 14B are tables illustrating MAC-CE definitions for a request to change an offset, in accordance with aspects of the present disclosure.

DETAILED DESCRIPTION

Figure 1:
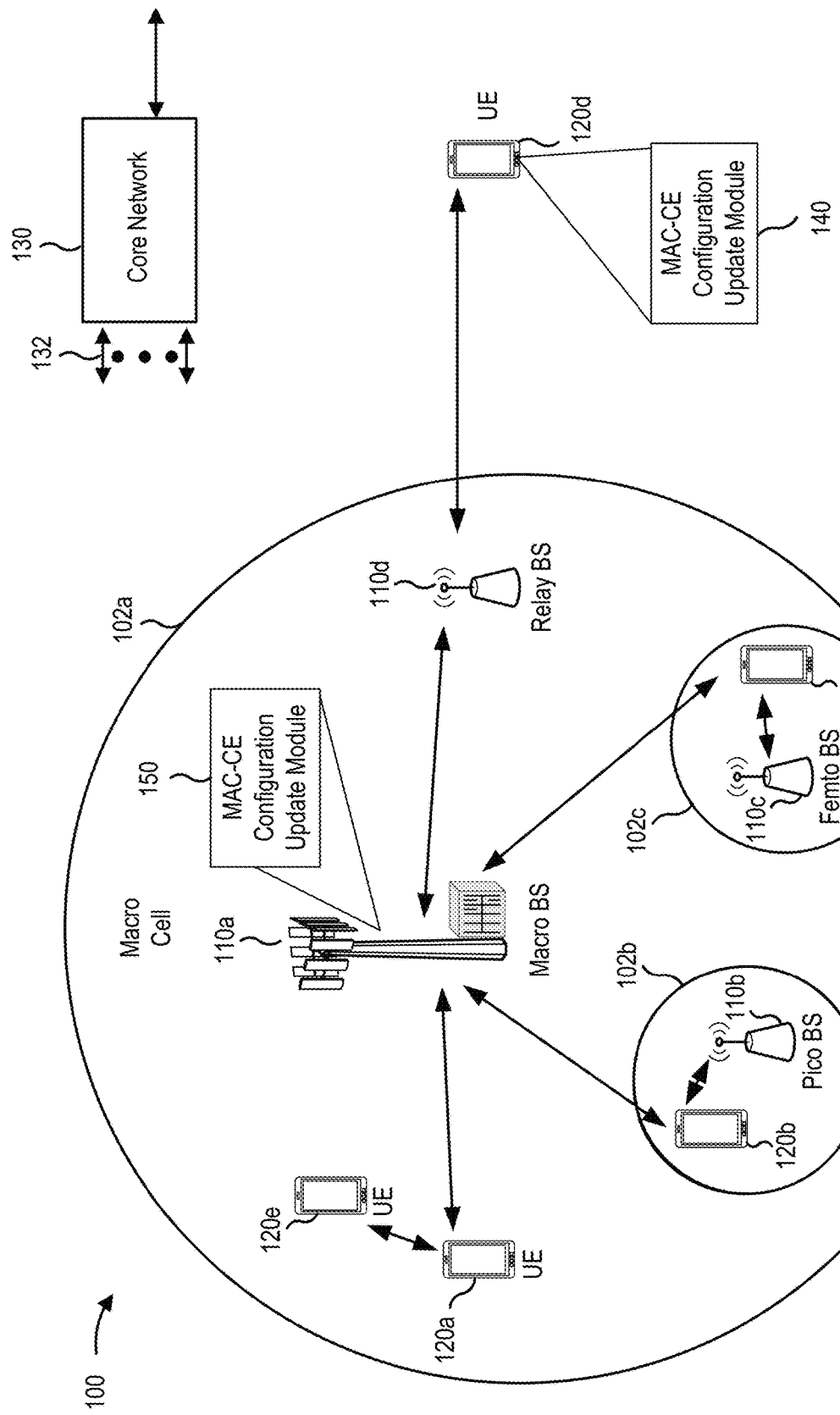
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

Wireless communications involve signals transmitted across wireless channels. Some of these wireless channels may be periodic, while other wireless channels may be controlled dynamically. Periodic channels have the advantage that overhead for controlling the channels occurs one time, at the beginning of the period, with later updates also possible. Thus, control signaling is reduced relative to dynamic scheduling, resulting in reduced network traffic and power savings. Periodic channels may also reduce latency.

Other wireless techniques may also be periodic, such as connected mode discontinuous reception (CDRX). CDRX is a tool for power savings while a UE is operating in connected mode. Discontinuous reception (DRX) is a power saving cycle where a user equipment (UE) sleeps for a period of time and then awakens during an ON duration to listen for and transmit communications signals. The DRX pattern of off and on time periods may repeat. If the UE is not awake when downlink data arrives, the UE may not receive the data. If the UE is not awake when uplink data is to be transmitted, the UE may request uplink resources through a scheduling request, outside the ON duration. A drawback is the UE has to exit sleep mode, consuming additional power. In low latency scenarios, a DRX cycle and start of an ON duration should be time-aligned with downlink traffic arrivals. DRX-multimedia mismatch timing, however, is an issue that prevents such alignment and limits use of CDRX. Other periodic patterns, such as periodic channels, may also misalign with data.

With the current 3GPP standards, many UE specific channels or patterns may be configured in a periodic fashion. These channels and patterns may include a DRX cycle, scheduling request, uplink configured grant, downlink semi-persistent scheduling, physical uplink control channel (PUCCH) for channel state information (CSI) reporting or for beam management reporting, and sounding reference signals (SRSs), for example. The configuration of these channels or patterns may include a period and an offset within the period. The configuration may also indicate a radio resource configuration. A radio resource configuration may indicate a number of resource blocks (RBs), a number of symbols, a modulation and coding scheme (MCS) if applicable, etc.

Radio and periodic resources of these channels or patterns may be configured through radio resource control (RRC) signaling and downlink control information (DCI). If a change of configuration is needed for RRC configured information, the change is slow and cannot occur in a synchronized manner between a base station and a UE. If a change of configuration is needed for DCI configured information, the offset within the period is set to the slot carrying the physical downlink shared channel (PDSCH)/physical uplink shared channel (PUSCH) allocated by the DCI. Thus, a change of offset is not flexible.

According to aspects of the present disclosure, a medium access control (MAC)-control element (CE) signals a shift of an offset or change in radio resources of a periodic pattern, such as a periodic channel. For example, with respect to a DRX pattern, a MAC-CE may shift the start of an ON duration period. Currently, an ON duration period begins an amount of time (e.g., drx-ShortCycle or drx-LongCycle ms) after the start of the previous period. According to aspects of the present disclosure, a MAC control element signals a shift of the start of a next ON duration period.

In this specification, the terms "periodic pattern" and "periodic channel" may be used interchangeably. Moreover, the term "channel" may be used to describe scheduling requests, configured grants, semi-persistent scheduling, etc., even though such patterns are technically not channels.

In some aspects of the present disclosure, for example, during call establishment, a base station identifies or learns that the downlink traffic corresponds to an extended reality (XR) application with a specific period (e.g., 8.333 ms or 16.667 ms). As a result, the base station selects the DRX cycle that is closest to this period (e.g., eight milliseconds (8 ms)). The base station also detects that the start of a next ON duration period should be shifted to better match with the arrival time of the next downlink data burst from the XR application. During the DRX active time, the base station sends a MAC control element (e.g. a DRX shift command or an offset change command) to signal the UE that the next ON duration shall be shifted by some amount of time (e.g., by one ms).

The MAC-CE may also instruct a shift in radio resources of a periodic pattern. In these aspects of the present disclosure, the base station may configure a set of radio resources through RRC signaling. At any point in time, only one radio resource is activated. A base station may send a MAC-CE to indicate which radio resources are active.

When a MAC-CE changes offsets of periodic patterns, the new offset of each pattern should be consistent with the direction of the slot. In frequency division duplex (FDD) systems, all slots can be used for downlink and uplink communications, and thus the offset can be any value within the period. In time division duplex (TDD) systems, the direction depends on the frame structure, such as a [downlink, downlink, downlink, special subframe, uplink] ('DDDSU') frame structure, where four slots (DDDS) can be used for downlink operation and two slots (SU) can be used for uplink operation. Thus, the offset can be set to specific values only. That is, the value of the offset should be consistent with the direction of the slot. For example, the offset of a semi-persistent scheduled resource should match a 'D' slot or an 'S' slot. An offset of a configured grant should match an 'S' slot or a 'U' slot.

According to aspects of the present disclosure, the base station configures the UE with one list for the downlink ('downlinkOffsetList') and one list for the uplink ('uplinkOffsetList'). Each list contains a number of slots to shift the current offset. For example, in a TDD system with a DDDSU pattern, the uplinkShiftList may be {0, −5, +5}, where 0 means no change, +5 means delaying the offset by 5 slots, and −5 means moving the offset ahead by five slots. The downlinkShiftList may be {0, −1, −2, +1, +2}, where 0 means no change, −1 means moving the offset ahead of its current position by 1 slots, etc. In FDD, a single list should be sufficient, but for the sake of simplicity, two lists are considered. These two lists may be common to all channels.

According to aspects of the present disclosure, there may be two types of lists. The first type of list is an absolute list, where each list contains the exact values of the offsets. As an example, a list is set to {a, b, c . . . }, where the offset is set to slot a inside the period, slot b inside the period, or slot c within the period. The second type of list is a relative list, where each list contains the number of slots by which the current offset should be shifted. As an example, a list is set to {−a, −b, +c . . . }, where the offset is moved from the current position by a or b slots ahead, or the offset is delayed by c slots. The two lists may be common to all patterns with which the UE is configured.

The base station sends a new MAC-CE to change the radio resource, the offset, or both for one or more periodic channels or patterns. According to aspects of the present disclosure, for each channel/pattern that the base station would like to change the configuration, the new MAC-CE contains two indexes: a radio index and a shift index. The MAC-CE also indicates which pattern will be configured.

As described, the base station sends a MAC-CE to change the radio resource, the offset, or both for one or more channels/patterns. Aspects of the present disclosure propose solutions for when to apply the change. As the new MAC-CE may change the radio resources and/or offsets of channels/patterns, any change in the base station and in the UE should be synchronized. Hybrid automatic repeat request (HARQ) retransmissions may be applied to the MAC-CE. Aspects of the present disclosure use the slot during which the HARQ-acknowledgement (HARQ-ACK) is transmitted or received by the UE or base station as a synchronization time. This synchronization time may be referred to as 'T0'. The actual application of the change of the configuration may occur at time T0+$\alpha$, where a is a constant. In some aspects, the value of a may be defined in the standards. As a result of this synchronization, the base station and the UE apply the MAC-CE changes at the same time.

Aspects of the present disclosure help recover from transmission failure. For example, in a scenario where a UE transmits a negative acknowledgment (e.g., a HARQ-negative acknowledgment (NACK)) indicating transmission failure, the base station may wrongly interpret the negative acknowledgment as a positive acknowledgment (e.g., a HARQ-ACK). In this case, the base station applies the changes while the UE does not. Consequently, the base station will no longer be able to receive the uplink channels correctly.

To recover from such desynchronization scenarios, a specific 'reset' codepoint may be included in the MAC-CE to return to the very first configuration. The first configuration may be the RRC-based configuration (e.g., the radioList) or may be values received in the DCI, such as the slot carrying the PDSCH/PUSCH allocated by the DCI. In some aspects, a single reset bit is common to all channels. Thus, a base station may detect an out of sync condition and then send the MAC-CE with the reset point, to resynchronize with the UE. To ensure the UE is awake when transmitting the reset command, the base station may wait for the reception of the next uplink transmission from the UE.

According to aspects of the present disclosure, a UE may transmit a MAC-CE in the uplink to request a change of offset or configuration. As described, the UE may detect that the current offset of a channel/pattern no longer matches the current situation. For example, with DRX, the UE may detect that the ON Duration periods no longer match the arrival times of uplink data in the UE's transmission buffer. The criteria of this identification may be either standardized or left to the UE implementation.

To notify the base station, the UE transmits a new MAC-CE (e.g., Offset Change Request) to request a change in offset/configuration. The UE MAC-CE may be of variable size and may contain a list of channels/patterns the UE would like the base station to change. For each pattern/ channel, the MAC-CE may also include an index pointing to the entry either in the downlinkShiftList or in the uplinkShiftList (depending on the direction of the channel) that the UE is suggesting. The request may include one shift index for each of the channels. Upon reception of the new MAC-CE, the base station decides whether to deny the request or to grant the request. For example, the base station may decide to change the offsets of some channels/patterns and/or change the radio resources of some channels/patterns.

In some scenarios, the base station may not grant the request from the UE. That is, the base station may deny the request (by not sending a MAC-CE) instead of granting the request (by sending the MAC-CE). In these scenarios, the criteria for sending a new request are likely to remain satisfied. To prevent the UE from sending too many MAC-CEs, a prohibit timer may be introduced. The prohibit timer may forbid transmission of a request for a change until the prohibit timer expires. In some configurations, once the UE transmits a request, the UE starts the prohibit timer. The UE is not allowed to transmit another request until the prohibit timer expires. In some aspects, the base station may disable the prohibit timer by setting its value to zero.

Aspects of the present disclosure enable a base station to adapt a time configuration of channels/patterns to the current traffic. MAC signaling is a robust and quick mechanism, and is much quicker than RRC signaling. Benefits of the present disclosure include power savings, as well as improved latency. Reliability is also improved. For example, channel quality indicator (CQI) reporting may occur before the start of transmission of a downlink frame. Other benefits include enabling a UE to signal to the base station that the configuration of channels/patterns should be changed to better suit the current traffic. Moreover, the base station can quickly change the radio resource of channels, improving scheduling flexibility. Reliability is improved, as the radio resource configuration can be quickly adapted to the current radio conditions.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, an NR BS, a Node B, a gNB, a 5G node B, an access point, a transmit and receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB," "base station," "NR BS," "gNB," "AP," "node B," "5G NB," "TRP," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in the wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

As an example, the BSs 110 (shown as BS 110a, BS 110b, BS 110c, and BS 110d) and the core network 130 may exchange communications via backhaul links 132 (e.g., S1, etc.). Base stations 110 may communicate with one another over other backhaul links (e.g., X2, etc.) either directly or indirectly (e.g., through core network 130).

The core network 130 may be an evolved packet core (EPC), which may include at least one mobility management entity (MME), at least one serving gateway (S-GW), and at least one packet data network (PDN) gateway (P-GW). The MME may be the control node that processes the signaling between the UEs 120 and the EPC. All user IP packets may be transferred through the S-GW, which itself may be connected to the P-GW. The P-GW may provide IP address allocation as well as other functions. The P-GW may be connected to the network operator's IP services. The operator's IP services may include the Internet, the Intranet, an IP multimedia subsystem (IMS), and a packet-switched (PS) streaming service.

The core network 130 may provide user authentication, access authorization, tracking, IP connectivity, and other access, routing, or mobility functions. One or more of the base stations 110 or access node controllers (ANCs) may interface with the core network 130 through backhaul links 132 (e.g., S1, S2, etc.) and may perform radio configuration and scheduling for communications with the UEs 120. In some configurations, various functions of each access network entity or base station 110 may be distributed across various network devices (e.g., radio heads and access network controllers) or consolidated into a single network device (e.g., a base station 110).

UEs 120 (e.g., 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

One or more UEs 120 may establish a protocol data unit (PDU) session for a network slice. In some cases, the UE 120 may select a network slice based on an application or subscription service. By having different network slices serving different applications or subscriptions, the UE 120 may improve its resource utilization in the wireless communications system 100, while also satisfying performance specifications of individual applications of the UE 120. In some cases, the network slices used by UE 120 may be served by an AMF (not shown in FIG. 1) associated with one or both of the base station 110 or core network 130. In addition, session management of the network slices may be performed by an access and mobility management function (AMF).

The UEs 120 may include a MAC-CE configuration update module 140. For brevity, only one UE 120*d* is shown as including the MAC-CE configuration update module 140. The MAC-CE configuration update module 140 may receive, from a base station, a medium access control-control element (MAC-CE) including an offset change command. The MAC-CE configuration update module 140 may also adjust an offset within a periodic pattern based on the offset change command.

The core network 130 or the base stations 110 may include a MAC-CE configuration update module 150. The MAC-CE configuration update module 150 may detect a misalignment between an arrival time of data relative to a periodic pattern. The MAC-CE configuration update module 150 may also transmit, to a user equipment (UE), a medium access control-control element (MAC-CE) including an offset change command to adjust an offset within the periodic pattern.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (e.g., a system information block (SIB).

As indicated above, FIG. 1 is provided merely as an example. Other examples may differ from what is described with regard to FIG. 1.

Figure 2:
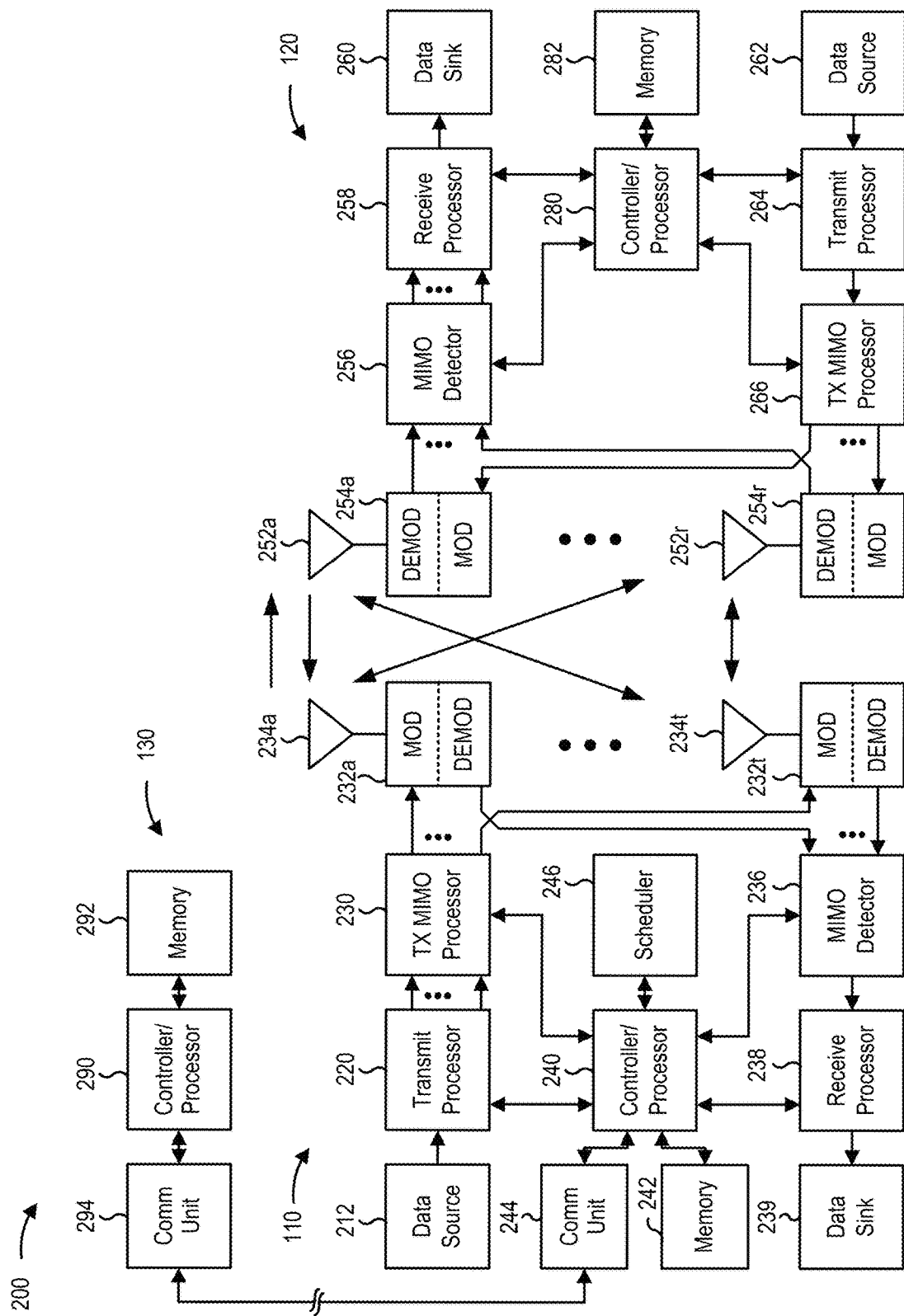
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234*a* through 234*t*, and UE 120 may be equipped with R antennas 252*a* through 252*r*, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Decreasing the MCS lowers throughput but increases reliability of the transmission. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At the UE 120, antennas 252a through 252r may receive the downlink signals from the base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (e.g., for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the core network 130 via the communications unit 244. The core network 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with MAC-CE configuration updates as described in more detail elsewhere. For example, the controller/processor 240 of the base station 110, the controller/processor 280 of the UE 120, and/or any other component(s) of FIG. 2 may perform or direct operations of, for example, the processes of FIGS. 15 and 16 and/or other processes as described. Memories 242 and 282 may store data and program codes for the base station 110 and UE 120, respectively. A scheduler 246 may schedule UEs for data transmission on the downlink and/or uplink.

In some aspects, the UE 120 or base station 110 may include means for receiving, means for transmitting, means for synchronizing, means for forbidding, means for detecting, and means for adjusting. Such means may include one or more components of the UE 120 or base station 110 described in connection with FIG. 2.

As indicated above, FIG. 2 is provided merely as an example. Other examples may differ from what is described with regard to FIG. 2.

Wireless communications involve signals transmitted across wireless channels. Some of these wireless channels may be periodic, while other wireless channels may be controlled dynamically. Periodic channels have the advantage that overhead for controlling the channels occurs one time, at the beginning of the period, with later updates also possible. Thus, control signaling is reduced relative to dynamic scheduling, resulting in reduced network traffic and power savings. Periodic channels may also reduce latency.

Many devices have power constraints with low latency traffic. For example, augmented reality (AR) glass designs should have battery life to match the expectation for smartphone battery life. Overall speaking, AR glass power dissipation can lead to poor user experience resulting from short battery life, because long battery life has always been a key consideration for gaming devices. Gaming traffic is generally expected to be low latency traffic to improve gameplay.

In low latency scenarios, a discontinuous reception (DRX) cycle and start offset should be time-aligned with downlink traffic arrivals. DRX-multimedia mismatch timing, however, is a significant issue that prevents such alignment and limits use of connected mode DRX (CDRX) as a tool for power savings with extended reality (XR) and cloud gaming. DRX is a power saving technique where a UE sleeps for a period of time and then awakens during an ON duration to listen for and transmit communications signals. If the UE is not awake when data arrives, the UE may not receive the data. If the UE is not awake when data is to be transmitted, the UE may request uplink resources through a scheduling request, outside the ON duration. Unfortunately, this scheduling request process consumes additional power.

Figure 3:
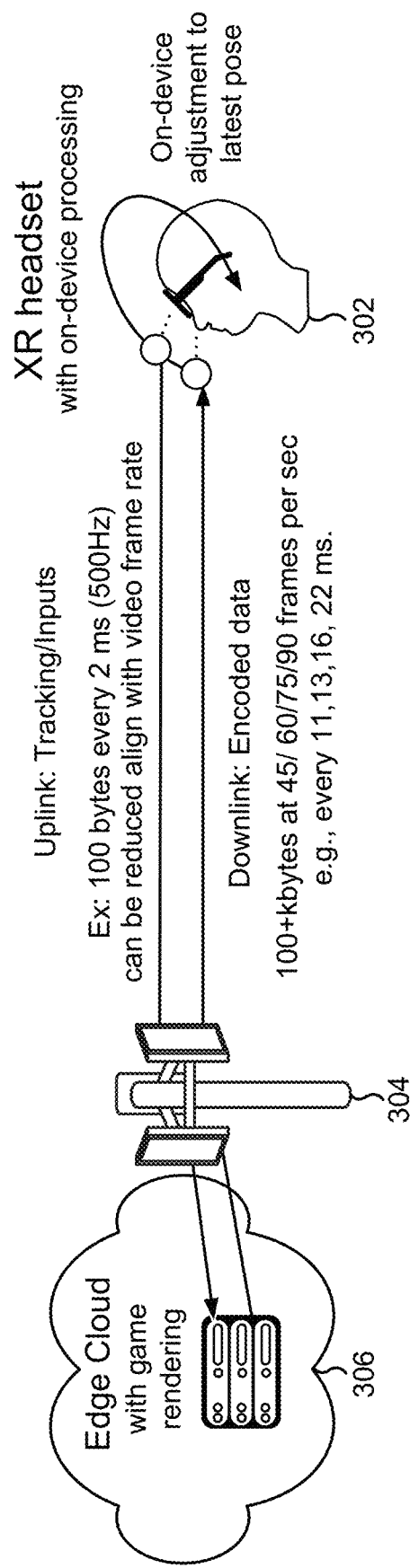
FIG. 3 is a diagram illustrating low latency traffic, in accordance with aspects of the present disclosure.

FIG. 3 is a diagram illustrating low latency traffic, in accordance with aspects of the present disclosure. The low latency traffic may be extended reality (XR) or cloud gaming traffic. Extended reality (XR) and cloud gaming downlink traffic may utilize H.264/H.265 compression standard encoded videos, which are quasi-periodic with bursts every frame at one frame per second (fps) or two possibly staggered "eye-buffers" per frame at 1/(2*fps). The frames can be split into multiple files, each processed separately. The files of each frame can be Intra-coded (I) or Predicted (P).

In the example of FIG. 3, a user 302 communicates via a base station 304 with a game server 306 in the cloud. The user 302 may wear an extended reality (XR) headset, such as a virtual reality (VR), mixed reality (MR) or augmented reality (AR) headset. During gameplay, the user 302 transmits uplink data to the server 306. The uplink data may include controller information as well as user pose information. The uplink data may have a periodicity of 100 bytes every two ms, for example, which corresponds to 500 Hz. Downlink data received from the server 306 may be received at the rate of 45, 60, 75, or 90 fps. That is, the downlink data may arrive every 11, 13, 16, or 22 ms. The downlink data may be 100 or more kB. Periodicity of the uplink data may be reduced to align with the downlink traffic.

The periodicity of the data may not match with a periodicity of wireless channels used for wireless communication. The data periodicity may also not align with a UE power savings technique, such as a discontinuous reception (DRX) mode. For extended reality (XR) applications, the update rate for uplink traffic is typically 120 Hz, 90 Hz, or 60 Hz, while the traffic burst arrival periodicity is 8.333, 11.111, or 16.667 ms. A traffic burst interval at 120 Hz or 60 Hz expressed in milliseconds has a factor of three in the denominator, which cannot divide into the numerator, when the numerator is an integer (e.g., 25 for a 120 Hz update rate, or 50 for a 60 Hz update). A periodic pattern, such as CDRX, has milliseconds as the finest granularity for a DRX cycle and ON duration configuration. If a DRX cycle granularity is defined in slots, the expression would be:

(number of slots in a second ($Y$))/(source update rate in Hz)=$Y$/3

As such, a DRX-cycle configuration of eight ms or nine ms, or either 22 or 23 slots per period would result in some misalignment with traffic burst arrivals. Improvements on slot or symbol granularity would not resolve this issue.

Figure 4:
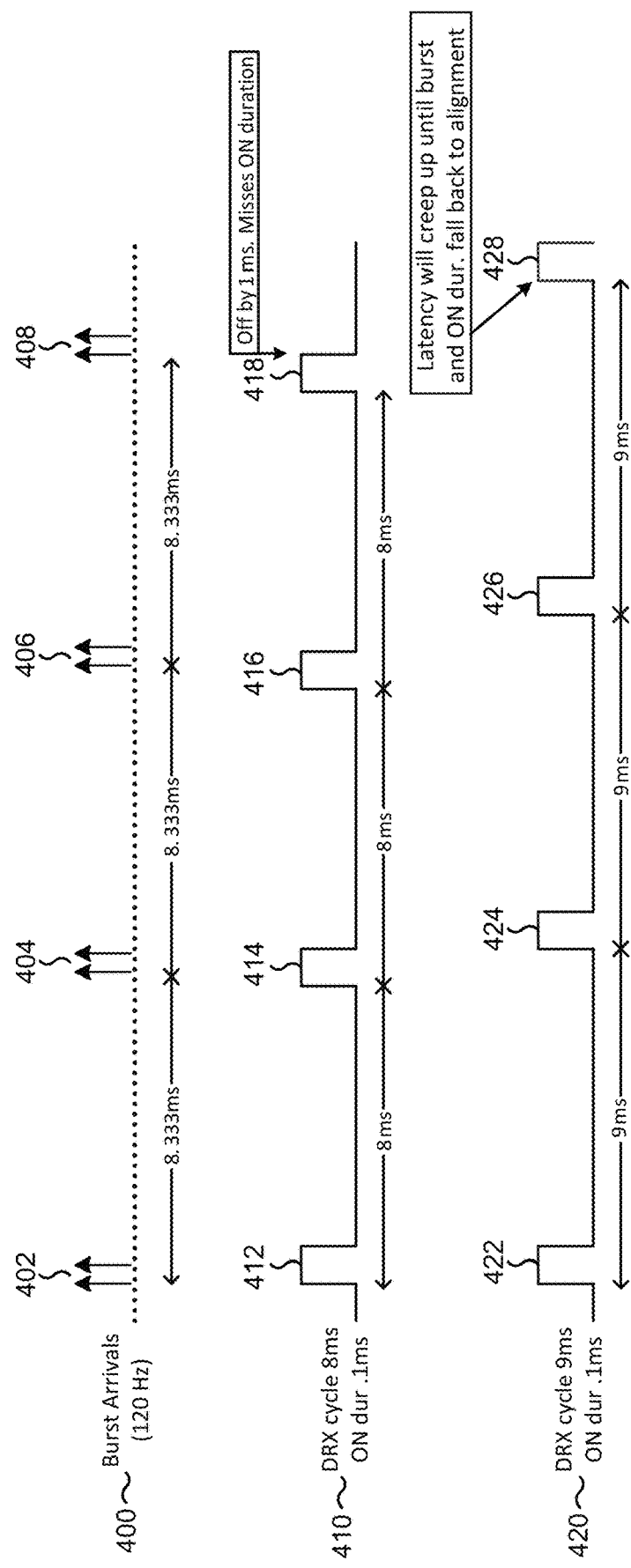
FIG. 4 illustrates timelines showing a periodicity mismatch between data and a discontinuous reception (DRX) cycle, in accordance with aspects of the present disclosure.

FIG. 4 illustrates timelines showing a periodicity mismatch between data and a discontinuous reception (DRX) cycle, in accordance with aspects of the present disclosure. A first timeline 400 shows burst arrivals occurring at a rate of 120 Hz. A second timeline 410 shows ON durations in an eight ms DRX cycle. A third timeline 420 shows ON durations in a nine ms DRX cycle. As seen in FIG. 4, a first burst 402 arrives and aligns with a first ON duration of the eight ms DRX cycle 412 and also the first ON duration of the nine ms DRX cycle 422. Thus, a UE would be able to successfully receive the first burst 402 with either DRX pattern. A second burst 404 arrives and aligns with a second ON duration of the eight ms DRX cycle 414 but no longer aligns with the second ON duration of the nine ms DRX cycle 424. A third burst 406 arrives and aligns with a third ON duration of the eight ms DRX cycle 416 but does not align with the third ON duration of the nine ms DRX cycle 426. A fourth burst 408 arrives and does not align with a fourth ON duration of the eight ms DRX cycle 418. The fourth burst 408 misses the fourth ON duration of the eight ms DRX cycle 418 by one ms, and thus will not be received. The fourth burst 408 also misses the fourth ON duration of the nine ms DRX cycle 428. With both DRX cycles, the latency will accumulate until the ON duration of the eight and nine ms DRX cycles eventually realign with the burst arrivals.

Figure 5:
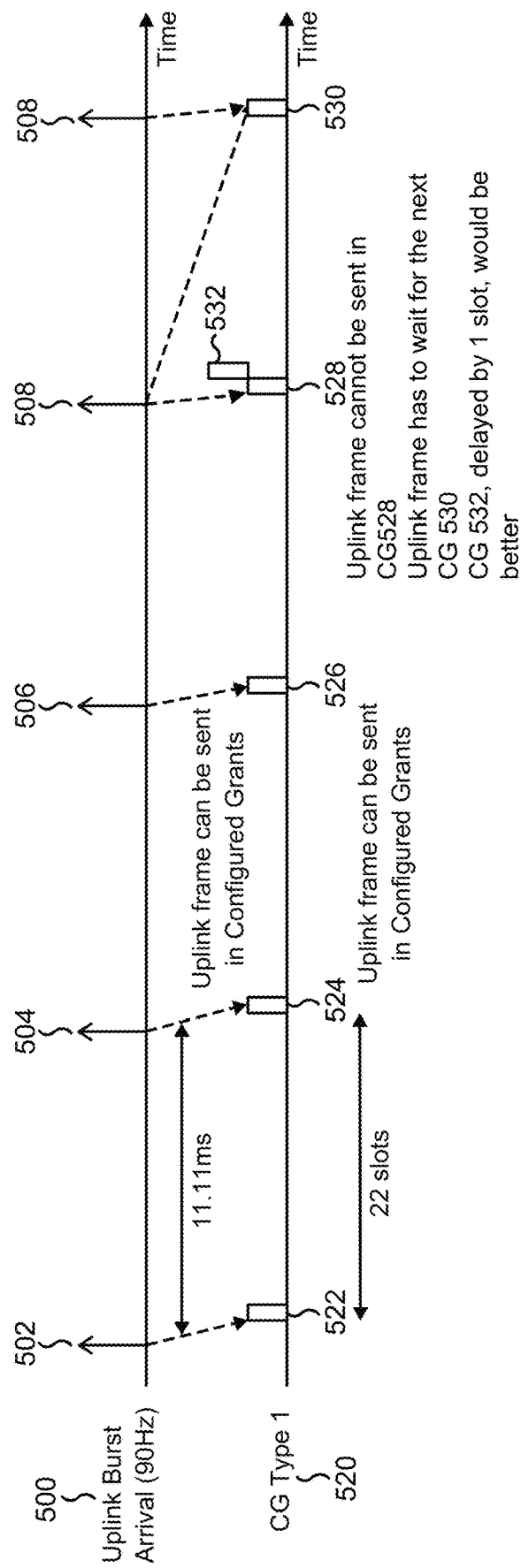
FIG. 5 illustrates timelines showing a periodicity mismatch between data and a configured grant (CG) cycle, in accordance with aspects of the present disclosure.

FIG. 5 illustrates timelines showing a periodicity mismatch for data and a configured grant (CG) cycle, in accordance with aspects of the present disclosure. In FIG. 5, a CG periodic pattern is discussed as an example of a periodic pattern, instead of a DRX cycle. A first timeline 500 shows uplink burst arrivals occurring at a rate of 90 Hz, corresponding to once every 11.1 ms. A second timeline 520 shows configured grants, type one, with a 22-slot period. A type one CG is provided by radio resource control (RRC) signaling and includes an uplink grant indicating activation of the grant.

As seen in FIG. 5, a first burst 502 is ready to send and will be sent based on the grant for frame 522. A second burst 504 and third burst 506 are ready to send and will be sent based on the grants for frame 524 and frame 526, respectively. A fourth burst 508, however, occurs too close to frame 528, preventing the uplink burst 508 from sending based on the grant for frame 528. The uplink burst 508 has to wait until the next uplink grant at frame 530 before sending. An uplink grant at frame 532, occurring after frame 528, would permit the uplink burst 508 to send without such a delay. A fifth burst 510 occurs too close to frame 530, preventing the uplink burst 510 from sending in frame 530.

With the current 3GPP standards, many UE specific channels or patterns may be configured in a periodic fashion. These channels and patterns may include a DRX cycle, scheduling request, uplink configured grant, downlink semi-persistent scheduling, physical uplink control channel (PUCCH) for channel state information (CSI) reporting or for beam management reporting, and sounding reference signal, for example. The configuration of these channels or patterns may include a period and an offset within the period. The configuration may also indicate a radio resource configuration. A radio resource configuration may indicate a number of resource blocks (RBs), a number of symbols, a modulation and coding scheme (MCS) if applicable, etc.

Radio and periodic resources of these channels or patterns may be configured through RRC signaling and downlink control information (DCI). For example, PUCCH resources for a scheduling request, PUCCH resource for CSI reporting, and PUCCH resources for beam management reporting may all be configured by RRC signaling. Configured grant, type 1 may be configured by RRC signaling, whereas configured grant, type 2 may be configured by RRC signaling and DCI. Semi-persistent scheduling may be configured by RRC signaling and DCI, whereas sounding reference signals (SRSs) may be configured by RRC signaling alone. If a change of configuration is needed for RRC configured information, the change is slow and cannot occur in a synchronized manner between a base station and a UE. If a change of configuration is needed for DCI configured information, the offset within the period is set to the slot carrying the physical downlink shared channel (PDSCH)/physical uplink shared channel (PUSCH) allocated by the DCI. Thus, a change of offset is not flexible.

Figure 6:
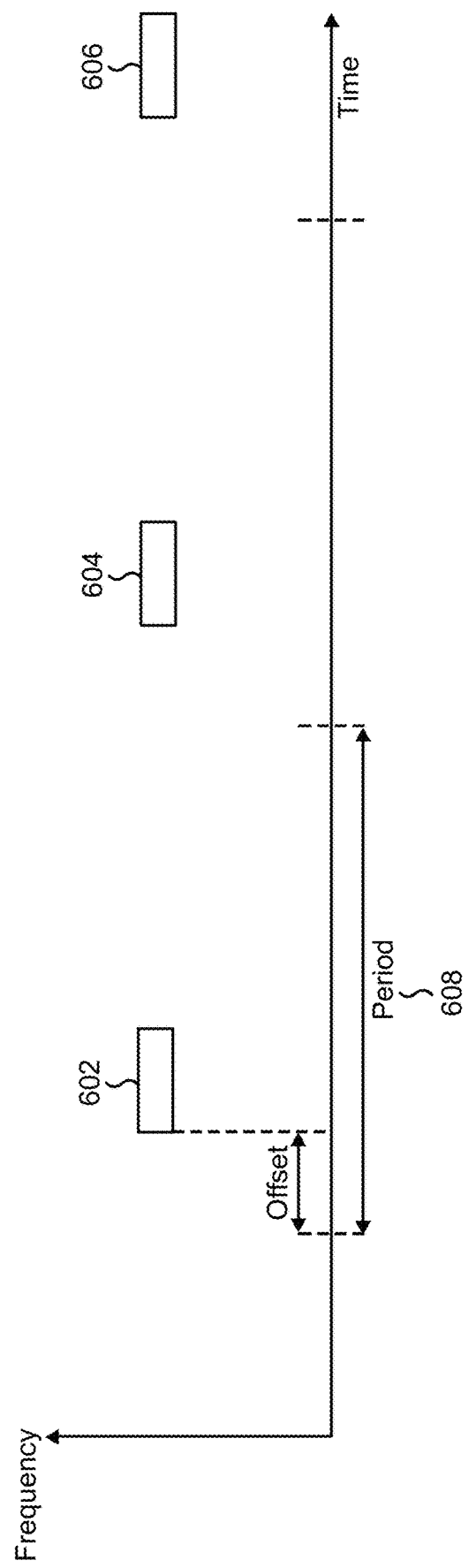
FIG. 6 is a timeline showing an offset configured for a DRX cycle, in accordance with aspects of the present disclosure.

As an example for a periodic DRX pattern, a radio resource control (RRC) information element 'drx-Long-CycleStartOffset' may configure an offset. FIG. 6 is a timeline showing an offset configured for a DRX cycle, in accordance with aspects of the present disclosure. In FIG. 6, three ON durations 602, 604, 606 are shown. The first ON duration 602 occurs within a period 608. Rather than starting at the beginning of the period 608, the first ON duration 602 starts later, at an offset from the beginning of the period 608.

According to aspects of the present disclosure, a medium access control (MAC)-control element (CE) signals a shift of an offset or change in radio resources of a periodic pattern or channel. For example, with respect to a DRX pattern, a MAC-CE may shift the start of an ON duration period. Currently, an ON duration period begins an amount of time (e.g., drx-ShortCycle or drx-LongCycle ms) after the start of the previous period. According to aspects of the present disclosure, a MAC control element signals a shift of the start of a next ON duration period.

In some aspects of the present disclosure, for example, during call establishment, a base station identifies or learns that the downlink traffic corresponds to an XR application with a specific period (e.g., 8.333 ms or 16.667 ms). As a result, the base station selects the DRX cycle that is closest to this period (e.g., eight ms). The base station also detects that the start of a next ON duration period should be shifted to better match with the arrival time of the next downlink data burst from the XR application. During the DRX active time, the base station sends a MAC control element (e.g. a DRX shift command or an offset change command) to signal the UE that the next ON duration shall be shifted by some amount of time (e.g., by one ms).

Figure 7:
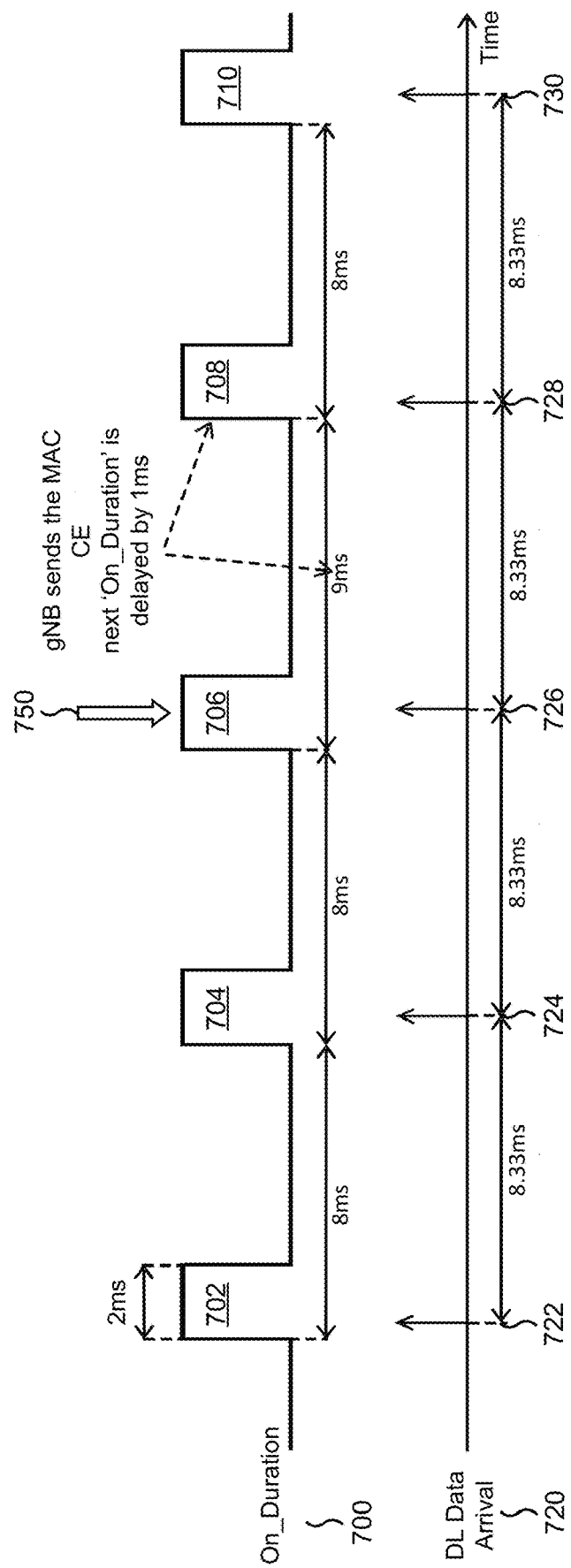
FIG. 7 illustrates timelines showing a change in offset for a periodic pattern, in accordance with aspects of the present disclosure.

FIG. 7 illustrates timelines showing a change in offset for a periodic pattern, in accordance with aspects of the present disclosure. An ON duration timeline 700 shows five ON duration periods 702, 704, 706, 708, 710, each having a two ms duration. The DRX cycle is eight ms, in this example. A downlink (DL) data arrival timeline 720 shows arrival data bursts 722, 724, 726, 728, 730. In this example, the downlink XR traffic has a period of 8.33 ms. As can be seen, the downlink data arrival times are shifting with respect to the DRX ON duration periods. The first three ON duration periods 702, 704, 706 align with the first three downlink data bursts 722, 724, 726. Because the base station detects the next data burst 728 may not align with the next ON duration period 708, at time 750, the base station instructs the UE to shift the ON duration. For example, the base station may send a MAC-CE with an offset change command instructing a one ms delay of the next ON duration period 708. In this case, nine ms elapse between the third ON duration period 706 and the fourth ON duration period 708, ensuring alignment with future downlink data bursts. As can be seen in FIG. 7, the fourth ON duration period 708 aligns with the fourth downlink data burst 728 as a result of the offset shift.

The MAC-CE may also instruct a shift in radio resources of a periodic pattern. In these aspects of the present disclosure, the base station may configure a set of radio resources through RRC signaling. At any point in time, only one radio resource is activated. A base station may send a MAC-CE to indicate which radio resources are active.

Figure 8:
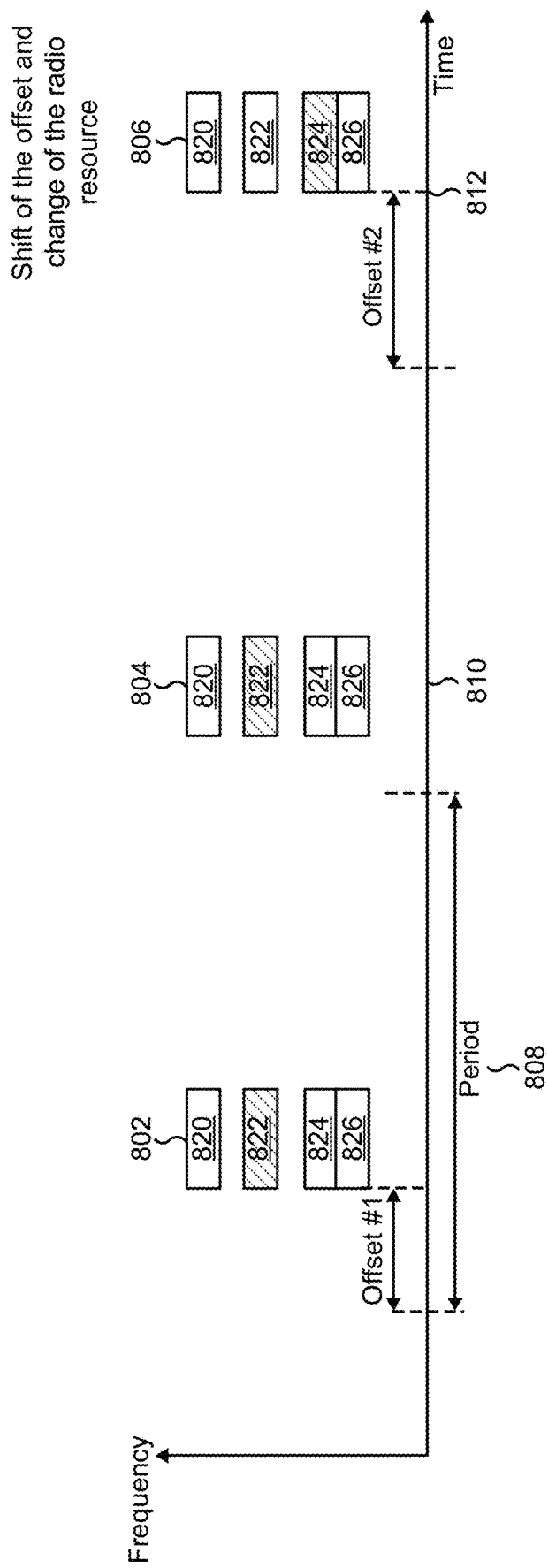
FIG. 8 is a timeline showing an offset and radio resource change configured for a periodic pattern, in accordance with aspects of the present disclosure.

FIG. 8 is a timeline showing an offset and radio resource change configured for a periodic pattern, in accordance with aspects of the present disclosure. Three sets of radio resources 802, 804, 806 are shown. Each set of radio resources 802, 804, 806 occurs within periods 808, 810, 812, respectively. Each set of radio resources 802, 804, 806 includes four different frequency resources 820, 822, 824, 826. In this example, a first MAC-CE indicates that the second frequency resources 822 are active during the first period 808. During the second period 810, the second frequency resources 822 are also active. For the third period 812, the base station transmits a second MAC-CE to change the radio resources. In this example, as a result of the MAC-CE, the third frequency resources 824 are activated during the third period 812.

A single MAC-CE allows changing of the offset in addition to the radio resources. As seen in FIG. 8, the first MAC-CE may also indicate a first offset (Offset #1) setting the offset of the radio resources inside the first and second periods 808, 810 The second MAC-CE may indicate a different offset (Offset #2) for the third period 812.

As described above, for PUCCH resources, configured grant, type 1 and sounding reference signals (SRSs), the radio resources are configured by RRC signaling. For configured grant, type 2, and semi-persistent scheduling, the radio resources are signaled by DCI formats. According to aspects of the present disclosure, for each channel/pattern, RRC signaling configures a list (e.g., a radioList) of radio resources. Examples of these radio resources for receiving and transmitting a channel/pattern may include a number of physical resource blocks, a number of symbols, an MCS, a number of demodulation reference signals (DMRS), a number of multiple input, multiple output (MIMO) layers, etc. For channels/patterns with radio resources currently signaled by RRC, the existing information elements (IEs) are changed into lists. For channels/patterns with radio resource currently signaled by DCI, a radioList is added to their RRC configurations. The radio resource signaled by the DCI that activates the configuration will be one of the entries of the radioList.

When a MAC-CE changes offsets of periodic patterns, the new offset of each pattern should be consistent with the direction of the slot. In frequency division duplex (FDD) systems, all slots can be used for downlink and uplink communications, and thus the offset can be any value within the period. In time division duplex (TDD) systems, the direction depends on the frame structure, such as a [downlink, downlink, downlink, special subframe, uplink] ('DDDSU') frame structure, where four slots (DDDS) can be used for downlink operation and two slots (SU) can be used for uplink operation. Thus, the offset can be set to specific values only. That is, the value of the offset should be consistent with the direction of the slot. For example, the offset of a semi-persistent scheduled resource should match a 'D' slot or an 'S' slot. An offset of a configured grant should match an 'S' slot or a 'U' slot.

According to aspects of the present disclosure, the base station configures the UE with one list for the downlink ('downlinkOffsetList') and one list for the uplink ('uplinkOffsetList'). Each list contains a number of slots to shift the current offset. For example, in a TDD system with a DDDSU pattern, the uplinkShiftList may be {0, −5, +5}, where 0 means no change, +5 means delaying the offset by 5 slots, and −5 means moving the offset ahead by five slots. The downlinkShiftList may be {0, −1, −2, +1, +2}, where 0 means no change, −1 means moving the offset ahead of its current position by 1 slots, etc. In FDD, a single list should be sufficient, but for the sake of simplicity, two lists are considered. These two lists may be common to all channels.

According to aspects of the present disclosure, there may be two types of lists. The first type of list is an absolute list, where each list contains the exact values of the offsets. As an example, a list is set to {a, b, c . . . }, where the offset is set to slot a inside the period, slot b inside the period, or slot c within the period. The second type of list is a relative list, where each list contains the number of slots by which the current offset should be shifted. As an example, a list is set to {−a, −b, +c . . . }, where the offset is moved from the current position by a or b slots ahead, or the offset is delayed by c slots. The two lists may be common to all patterns with which the UE is configured.

The base station sends a new MAC-CE to change the radio resource, the offset, or both for one or more periodic channels or patterns. According to aspects of the present disclosure, for each channel/pattern that the base station would like to change the configuration, the new MAC-CE contains two indexes: a radio index and a shift index. The MAC-CE also indicates which pattern will be configured.

FIG. 9 is a table showing indexes for activating radio resources of a periodic pattern, in accordance with aspects of the present disclosure. In the example of FIG. 9, the radio index of the MAC-CE contains an index to an entry in a radioList to be activated. For example, consider a radioList={'radioRes0', 'radioRes1', 'radioRes2', 'radioRes3', 'radioRes4'}. In the table of FIG. 9, the indexes 0 through 4 correspond to particular radio resources from the radioList.

The new MAC-CE may also include an index to change the offset of one or more of the periodic patterns/channels. For each pattern the base station attempts to change the offset of, the new MAC-CE contains one index that contains either the index of an entry in the lists (e.g., 'downlinkOffsetList' or 'uplinkOffsetList'), or a specific codepoint that represents the shift to the next slot or to the previous valid slot. This specific codepoint is applicable with relative lists.

FIG. 10 is a table showing indexes for applying an offset for a periodic pattern, in accordance with aspects of the present disclosure. In the example of FIG. 10, the relative uplinkOffsetList={0, −5, +5}. When the index in the MAC-CE is 0, no offset is applied. When the index is 1, the offset moves five slots ahead. When the index is 2, the offset is delayed five slots. When the codepoint is 'f' (forward), the offset should shift to the next valid uplink slot. When the codepoint is 'b' (backward), the offset should shift to the previous valid uplink slot.

In aspects of the present disclosure, the MAC-CE may vary in size, and contain the list of patterns/channels whose configuration is modified. The variable MAC-CE contains for each pattern/channel in the list, a radio index and a shift index.

FIGS. 11A and 11B are tables illustrating MAC-CE definitions for an offset change command, in accordance with aspects of the present disclosure. MAC-CEs are identified by a MAC subheader with a specific logical channel ID (LCID) value, and their sizes can be zero or more bits. A new MAC-CE 'Offset Change Command' may be added, where the LCID is set to 34, to signal a one-octet extended logical channel ID (eLCID) field. The eLCID may be set to a first available value (e.g. 244). Its size is zero bits.

According to aspects of the present disclosure, the base station decides when to send a MAC-CE to change offsets of periodic patterns. The decision to send the MAC-CE 'Offset Change Command' may be based on proprietary algorithms. As an example, with DRX, when the time difference ('d') between the arrival time of the downlink data in the base station buffer and the end of an ON duration period falls below a threshold, the base station sends the MAC-CE to move the offset of the next ON duration. In a PUCCH example, the base station may detect that the offset of the PUCCH resource used for channel quality index (CQI) reporting no longer matches the DRX ON duration. The decision may also occur in response to a request from the UE (described in more detail later with respect to FIG. 13). For example, the UE may detect that the offset of the configured grant, type 1 configuration no longer matches the time instant when an uplink data frame is available for transmission.

Figure 12:
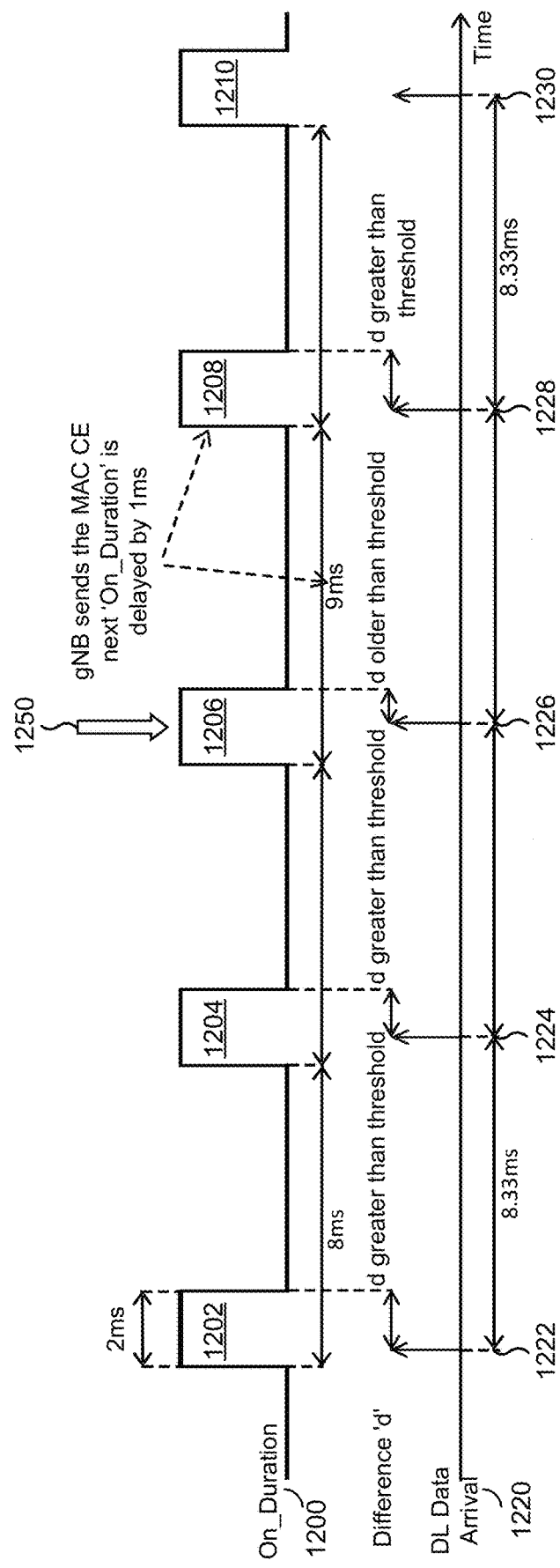
FIG. 12 illustrates timelines showing a condition triggering a change in offset for a periodic pattern, in accordance with aspects of the present disclosure.

FIG. 12 illustrates timelines showing a condition triggering a change in offset for a periodic pattern, in accordance with aspects of the present disclosure. In the example of FIG. 12, the triggering threshold is set to half the ON duration period in a DRX cycle. An ON duration timeline 1200 shows five ON duration periods 1202, 1204, 1206, 1208, 1210, each having a two ms duration. The DRX cycle is eight ms in this example. A downlink (DL) data arrival timeline 1220 shows arrival data bursts 1222, 1224, 1226, 1228, 1230. In this example, the downlink traffic has a period of 8.33 ms. As can be seen, the downlink data arrival times are shifting with respect to the DRX ON duration periods. The first two ON duration periods 1202, 1204 align with the first two downlink data bursts 1222, 1224. That is, the difference 'd' between the arrival of the data and the end of the ON duration is greater than the threshold.

At time 1250, the base station detects the next data burst 1226 may not align with the next ON duration period 1206, because the time 'd' is less than the threshold. Thus, the base station sends a MAC-CE instructing the UE to shift the ON duration. For example, the base station may send a MAC-CE with an offset change command instructing a one ms delay of the next ON duration period 1208. In this case, nine ms elapse between the third ON duration period 1206 and the fourth ON duration period 1208, ensuring alignment with future downlink data bursts. As can be seen in FIG. 12, the fourth and fifth ON duration periods 1208, 1210 align with the fourth and fifth downlink data bursts 1228, 1230, respectively.

As described, the base station sends a MAC-CE to change the radio resource, the offset, or both for one or more channels/patterns. Aspects of the present disclosure propose solutions for when to apply the change. As the new MAC-CE may change the radio resources and/or offsets of channels/patterns, any change in the base station and in the UE should be synchronized. HARQ retransmissions may be applied to the MAC-CE. Aspects of the present disclosure use the slot during which the HARQ-ACK is transmitted or received by the UE or base station as a synchronization time. This synchronization time may be referred to as 'T0'. The actual application of the change of the configuration may occur at time T0+α, where α is a constant. In some aspects, the value of a may be defined in the standards. As a result of this synchronization, the base station and the UE apply the MAC-CE changes at the same time.

Aspects of the present disclosure help recover from transmission failure. For example, in a scenario where a UE transmits a negative acknowledgment (e.g., a HARQ-NACK) indicating transmission failure, the base station may wrongly interpret the negative acknowledgment as a positive acknowledgment (e.g., a HARQ-ACK). In this case, the base station applies the changes while the UE does not. Consequently, the base station will no longer be able to receive the uplink channels correctly.

To recover from such desynchronization scenarios, a specific 'reset' codepoint may be included in the MAC-CE to return to the very first configuration. The first configuration may be the RRC-based configuration (e.g., the radioList) or may be values received in the DCI, such as the slot carrying the PDSCH/PUSCH allocated by the DCI. In some aspects, a single reset bit is common to all channels. Thus, a base station may detect an out of sync condition and then send the MAC-CE with the reset point, to resynchronize with the UE. To ensure the UE is awake when transmitting the reset command, the base station may wait for the reception of the next uplink transmission from the UE.

According to aspects of the present disclosure, a UE may transmit a MAC-CE in the uplink to request a change of offset or configuration. As described, the UE may detect that the current offset of a channel/pattern no longer matches the current situation. For example, with DRX, the UE may detect that the ON Duration periods no longer match the arrival times of uplink data in the UE's transmission buffer. The criteria of this identification may be either standardized or left to the UE implementation.

To notify the base station, the UE transmits a new MAC-CE (e.g., Offset Change Request) to request a change in offset/configuration. The UE MAC-CE may be of variable size and may contain a list of channels/patterns the UE would like the base station to change. For each pattern/channel, the MAC-CE may also include an index pointing to the entry either in the downlinkShiftList or in the uplinkShiftList (depending on the direction of the channel) that the UE is suggesting. The request may include one shift index for each of the channels. Upon reception of the new MAC-CE, the base station decides whether to deny the request or to grant the request. For example, the base station may decide to change the offsets of some channels/patterns and/or change the radio resources of some channels/patterns.

Figure 13:
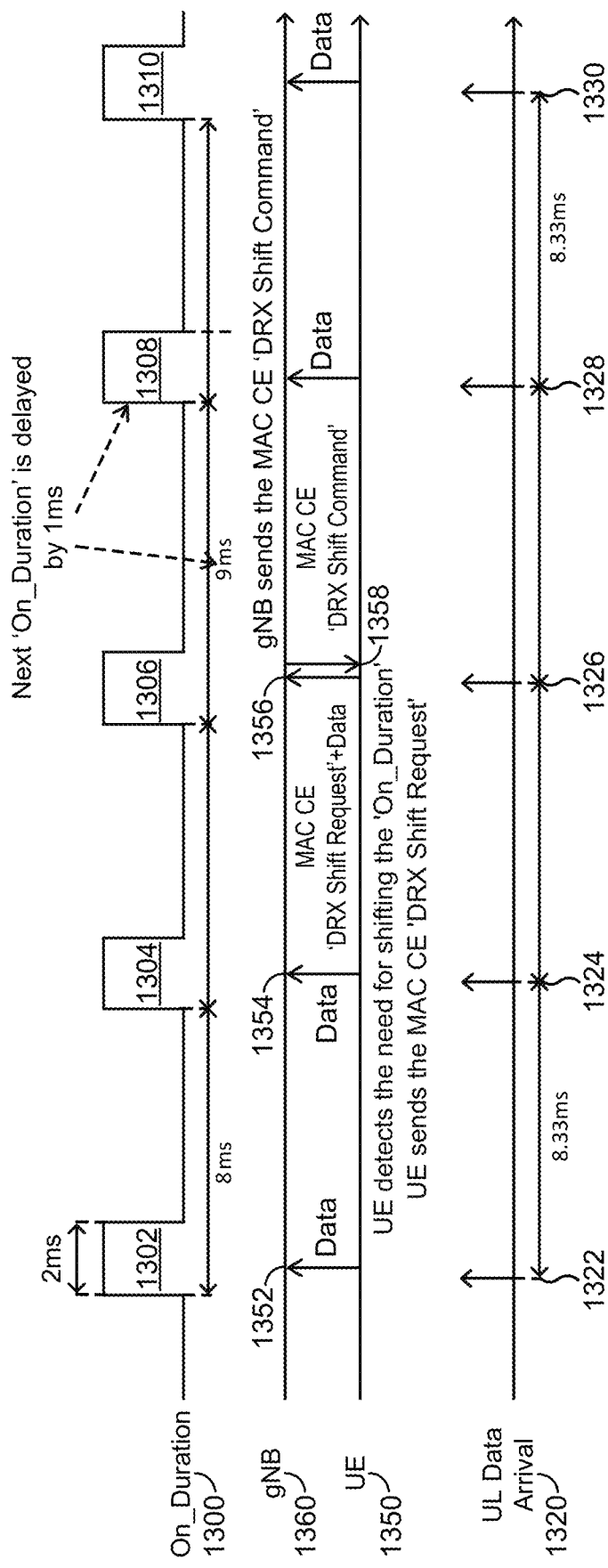
FIG. 13 illustrates timelines showing a request for a change in offset for a periodic pattern, in accordance with aspects of the present disclosure.

FIG. 13 illustrates timelines showing a request for a change in offset for a periodic pattern, in accordance with aspects of the present disclosure. In the example of FIG. 13, an ON duration timeline 1300 shows five DRX ON duration periods 1302, 1304, 1306, 1308, 1310, each having a two ms duration. The DRX cycle is eight ms in this example. An uplink (UL) data arrival timeline 1320 shows arrival data bursts 1322, 1324, 1326, 1328, 1330. In this example, the uplink traffic is XR with a period of 8.33 ms. A UE timeline 1350 and a base station (e.g., gNB) timeline 1360 illustrate communication between a UE and a base station. For example, at times 1352 and 1354, the UE transmits the uplink data bursts 1322, 1324 to the base station.

As can be seen, the uplink data arrival times are shifting with respect to the DRX ON duration periods. The first three ON duration periods 1302, 1304, 1306 align with the first three uplink data bursts 1322, 1324, 1326. Because the UE detects the next data burst 1328 may not align with the next ON duration period 1308, at time 1356, the UE transmits a MAC-CE requesting the offset change, along with the uplink data burst 1326. The MAC-CE may be referred to as a 'DRX Shift Command.' In response to receiving the UE MAC-CE, the base station instructs the UE to shift the ON duration at time 1358. For example, the base station may send a MAC-CE with an offset change command instructing a one ms delay of the next ON duration period 1308. In this case, nine ms elapse between the third ON duration period 1306 and the fourth ON duration period 1308, ensuring alignment with future data bursts. As can be seen in FIG. 13, the fourth ON duration period 1308 aligns with the fourth uplink data burst 1328, as does the fifth ON duration period 1310 and fifth data burst 1330.

FIGS. 14A and 14B are tables illustrating MAC-CE definitions for a request to change an offset, in accordance with aspects of the present disclosure. MAC control elements are identified by a MAC subheader with a specific logical channel ID (LCID) value, and their sizes can be zero or more bits. A new MAC control element 'Offset Change Request' may be added, where the LCID is set to 34, to signal a one-octet extended logical channel ID (eLCID) field. The eLCID may be set to a first available value (e.g. 244). Its size is zero bits.

In some scenarios, the base station may not grant the request from the UE. That is, the base station may deny the request (by not sending a MAC-CE) instead of granting the request (by sending the MAC-CE). In these scenarios, the criteria for sending a new request are likely to remain satisfied. To prevent the UE from sending too many MAC-CEs, a prohibit timer may be introduced. The prohibit timer may forbid transmission of a request for a change until the prohibit timer expires. In some configurations, once the UE transmits a request, the UE starts the prohibit timer. The UE is not allowed to transmit another request until the prohibit timer expires. In some aspects, the base station may disable the prohibit timer by setting its value to zero.

Aspects of the present disclosure enable a base station to adapt a time configuration of channels/patterns to the current traffic. MAC signaling is a robust and quick mechanism, and is much quicker than RRC signaling. Benefits of the present disclosure include power savings, as well as improved latency. Reliability is also improved. For example, CQI reporting may occur before the start of transmission of a downlink frame. Other benefits include enabling a UE to signal to a base station that the configuration of channels/patterns should be changed to better suit the current traffic. Moreover, the base station can quickly change the radio resource of channels, improving scheduling flexibility. Reliability is improved, as the radio resource configuration can be quickly adapted to the current radio conditions.

As indicated above, FIGS. 3-14B are provided as examples. Other examples may differ from what is described with respect to FIGS. 3-14B.

Figure 15:
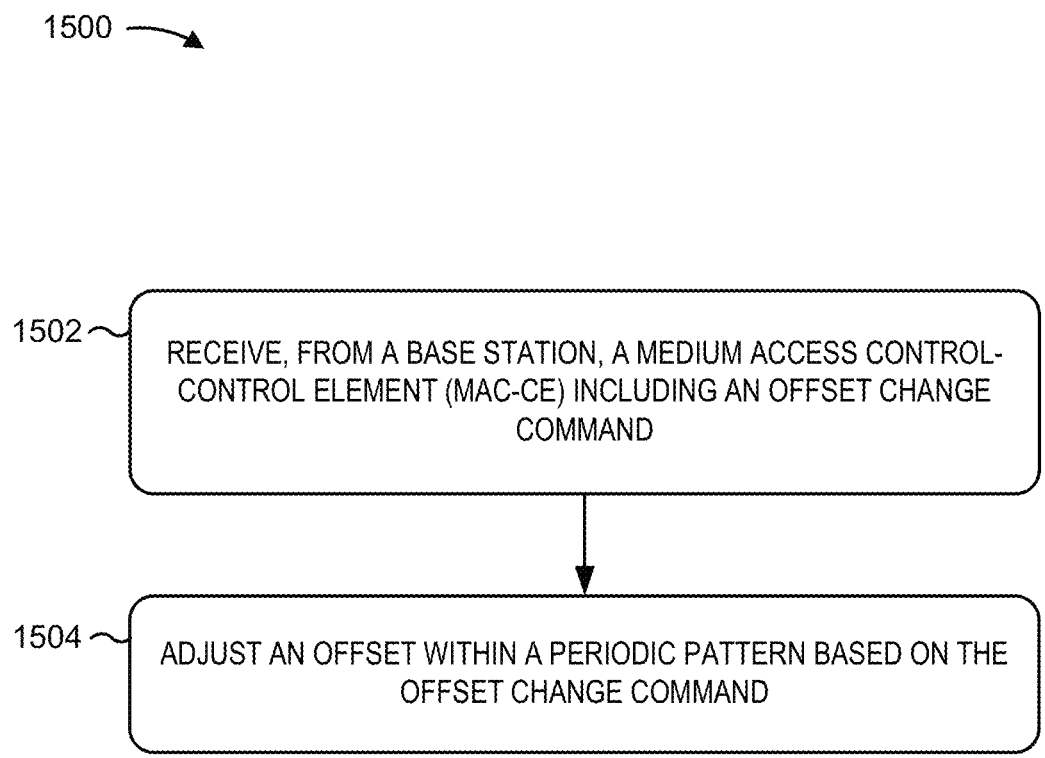
FIG. 15 is a flow diagram illustrating an example process performed, for example, by a user equipment (UE), in accordance with various aspects of the present disclosure.

FIG. 15 is a flow diagram illustrating an example process 1500 performed, for example, by a user equipment (UE), in accordance with various aspects of the present disclosure. The example process 1500 is an example of medium access control (MAC) control elements for controlling an offset and radio resources of a periodic pattern. The operations of the process 1500 may be implemented by a UE 120.

At block 1502, the user equipment (UE) receives, from a base station, a medium access control-control element (MAC-CE) including an offset change command. For example, the UE (e.g., using the antenna 252, DEMOD/MOD 254, MIMO detector 256, receive processor 258, controller/processor 280, and/or memory 282) may receive the MAC-CE. The offset change command may be received in response to an arrival time of data misaligning with the periodic pattern. A value of the offset change command may be consistent with a direction of a slot. The offset change command may comprise an index into a downlink offset list or an uplink offset list. The offset change command may include a reset code point.

At block 1504, the UE adjusts an offset within a periodic pattern based on the offset change command. For example, the UE (e.g., using controller/processor 280, and/or memory 282) may adjust the offset. For example, with respect to a DRX pattern, a MAC-CE may shift the start of an ON duration period. For example, a base station may send a MAC-CE with an offset change command instructing a one ms delay of the next ON duration period.

Figure 16:
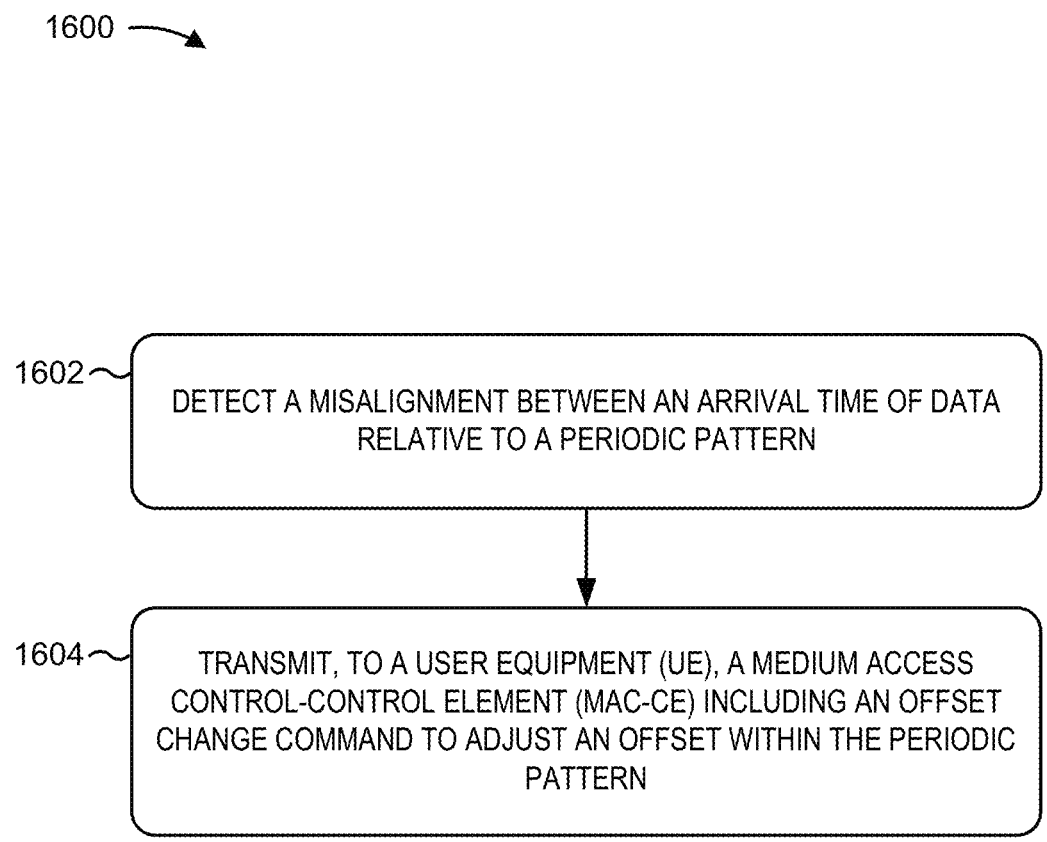
FIG. 16 is a flow diagram illustrating an example process performed, for example, by a base station, in accordance with various aspects of the present disclosure.

FIG. 16 is a flow diagram illustrating an example process 1600 performed, for example, by a base station, in accordance with various aspects of the present disclosure. The example process 1600 is an example of medium access control (MAC) control elements for controlling an offset and radio resources of a periodic pattern. The operations of the process 1600 may be implemented by a base station 110.

At block 1602, the base station detects a misalignment between an arrival time of data relative to a periodic pattern. For example, the base station (e.g., using MIMO detector 236) may detect the misalignment. For example, the base station may detects a next data burst may not align with the next ON duration period.

At block 1604, the base station transmits, to a user equipment (UE), a medium access control-control element (MAC-CE) including an offset change command to adjust an offset within the periodic pattern. For example, the base station (e.g., using the antenna 234, MOD/DEMOD 232, transmit processor 220, TX MIMO processor 230, controller/processor 240, and/or memory 242) may transmit the MAC-CE. For example, with respect to a DRX pattern, a MAC-CE may shift the start of an ON duration period. For example, a base station may send a MAC-CE with an offset change command instructing a one ms delay of the next ON duration period. The base station may transmit the MAC-CE in response to a request for the offset change command, received from a UE. The request may include a suggested offset amount and a periodic pattern to which the offset change applies.

Implementation examples are described in the following numbered clauses.

1. A method of wireless communication, by a user equipment (UE), comprising:
   receiving, from a base station, a medium access control-control element (MAC-CE) including an offset change command; and
   adjusting an offset within a periodic pattern based on the offset change command.

2. The method of clause 1, further comprising receiving the offset change command in response to an arrival time of data misaligning with the periodic pattern.

3. The method of clause 1 or 2, further comprising transmitting a request for the offset change command, the request including a suggested offset amount and the periodic pattern to which the offset change applies.

4. The method of any of the preceding clauses, in which a value of the offset change command is consistent with a direction of a slot.

5. The method of any of the preceding clauses, further comprising receiving a configuration including a downlink offset list and an uplink offset list.

6. The method of any of the preceding clauses, in which the downlink offset list includes a first list of absolute values of offsets, and the uplink offset list includes a second list of absolute values of offsets.

7. The method of any of clauses 1-5, in which the downlink offset list includes a first list of offset shift values, and the uplink offset list includes a second list of offset shift values.

8. The method of any of clauses 1-5, in which the offset change command comprises an index into the downlink offset list or the uplink offset list.

9. The method of any of the preceding clauses, further comprising transmitting a request for the offset change command, the request including an index into the downlink offset list or the uplink offset list.

10. The method of any of the preceding clauses, further comprising synchronizing, with the base station, application of the offset within the periodic pattern based on a slot during which an acknowledgment message is transmitted or received.

11. The method of any of the preceding clauses, in which the offset change command includes a reset code point.

12. The method of any of the preceding clauses, further comprising forbidding a transmission of a request for the offset change command until a prohibit timer expires.

13. The method of any of the preceding clauses, further comprising receiving an indication to disable the prohibit timer.

14. The method of any of the preceding clauses, further comprising:
receiving, from the base station, a set of radio resources via radio resource control (RRC) signaling; and
receiving, via the MAC-CE, an indication to activate one of the sets of radio resources.

15. The method of any of the preceding clauses, in which the set of radio resources comprises a plurality of sets, one set for each of a plurality of channels.

16. A method of wireless communication, by a base station, comprising:
detecting a misalignment between an arrival time of data relative to a periodic pattern; and
transmitting, to a user equipment (UE), a medium access control-control element (MAC-CE) including an offset change command to adjust an offset within the periodic pattern.

17. The method of clause 16, further comprising receiving, from the UE, a request for the offset change command, the request indicating the misalignment.

18. The method of clause 16 or 17, in which the request includes a suggested offset amount and the periodic pattern to which the offset change applies.

19. The method of any of the clauses 16-18, in which a value of the offset change command is consistent with a direction of a slot.

20. The method of any of the clauses 16-19, further comprising transmitting, to the UE, a configuration including a downlink offset list and an uplink offset list.

21. The method of any of the clauses 16-20, in which the downlink offset list includes a first list of absolute values of offsets, and the uplink offset list includes a second list of absolute values of offsets.

22. The method of any of the clauses 16-20, in which the downlink offset list includes a first list of offset shift values, and the uplink offset list includes a second list of offset shift values.

23. The method of any of the clauses 16-20, in which the offset change command comprises an index into the downlink offset list or the uplink offset list.

24. The method of any of the clauses 16-23, further comprising receiving a request for the offset change command, the request including an index into the downlink offset list or the uplink offset list.

25. The method of any of the clauses 16-24, further comprising synchronizing, with the UE, adjustment of the offset within the periodic pattern based on a slot during which an acknowledgment message is transmitted or received.

26. The method of any of the clauses 16-25, in which the offset change command includes a reset code point.

27. The method of any of the clauses 16-26, further comprising forbidding a transmission of a request for the offset change command until a prohibit timer expires.

28. The method of any of the clauses 16-27, further comprising transmitting an indication to disable the prohibit timer.

29. The method of any of the clauses 16-28, further comprising:
transmitting, to the UE, a set of radio resources via radio resource control (RRC) signaling, the set of radio resources comprising a plurality of sets, one set for each of a plurality of channels; and transmitting, via the MAC-CE, an indication to activate one of the set of radio resources.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method of wireless communication, by a user equipment (UE), comprising:
   receiving a periodic pattern configuration to enable communication with a base station for sending and/or receiving periodic traffic in accordance with the periodic pattern, the configuration comprising a period and an offset within the period;
   receiving, from the base station, a medium access control-control element (MAC-CE) including an offset change command; and
   adjusting the offset within the period based on the offset change command.

2. The method of claim 1, further comprising receiving the offset change command in response to an arrival time of data misaligning with the periodic pattern.

3. The method of claim 1, further comprising transmitting a request for the offset change command, the request including a suggested offset amount and the periodic pattern to which the offset change applies.

4. The method of claim 1, in which a value of the offset change command is consistent with a direction of a slot.

5. The method of claim 4, further comprising receiving a configuration including a downlink offset list and an uplink offset list.

6. The method of claim 5, in which the downlink offset list includes a first list of absolute values of offsets, and the uplink offset list includes a second list of absolute values of offsets.

7. The method of claim 5, in which the downlink offset list includes a first list of offset shift values, and the uplink offset list includes a second list of offset shift values.

8. The method of claim 5, in which the offset change command comprises an index into the downlink offset list or the uplink offset list.

9. The method of claim 5, further comprising transmitting a request for the offset change command, the request including an index into the downlink offset list or the uplink offset list.

10. The method of claim 1, further comprising synchronizing, with the base station, application of the offset within the periodic pattern based on a slot during which an acknowledgment message is transmitted or received.

11. The method of claim 10, in which the offset change command includes a reset code point.

12. The method of claim 1, further comprising forbidding a transmission of a request for the offset change command until a prohibit timer expires.

13. The method of claim 12, further comprising receiving an indication to disable the prohibit timer.

14. The method of claim 1, further comprising:
   receiving, from the base station, a set of radio resources via radio resource control (RRC) signaling; and
   receiving, via the MAC-CE, an indication to activate one of the sets of radio resources.

15. The method of claim 14, in which the set of radio resources comprises a plurality of sets, one set for each of a plurality of channels.

16. A method of wireless communication, by a base station, comprising:
   configuring a user equipment (UE) with a periodic pattern to enable sending and/or receiving periodic traffic in accordance with the periodic pattern, wherein configuring the UE with the periodic pattern includes configuring the UE with a period and with an offset within the period;
   detecting a misalignment between an arrival time of data of the periodic traffic relative to the periodic pattern; and
   transmitting, to the UE, a medium access control-control element (MAC-CE) including an offset change command to adjust the offset within the period based on the misalignment.

17. The method of claim 16, further comprising receiving, from the UE, a request for the offset change command, the request indicating the misalignment.

18. The method of claim 17, in which the request includes a suggested offset amount and the periodic pattern to which the offset change applies.

19. The method of claim 16, in which a value of the offset change command is consistent with a direction of a slot.

20. The method of claim 19, further comprising transmitting, to the UE, a configuration including a downlink offset list and an uplink offset list.

21. The method of claim 20, in which the downlink offset list includes a first list of absolute values of offsets, and the uplink offset list includes a second list of absolute values of offsets.

22. The method of claim 20, in which the downlink offset list includes a first list of offset shift values, and the uplink offset list includes a second list of offset shift values.

23. The method of claim 20, in which the offset change command comprises an index into the downlink offset list or the uplink offset list.

24. The method of claim 20, further comprising receiving a request for the offset change command, the request including an index into the downlink offset list or the uplink offset list.

25. The method of claim 16, further comprising synchronizing, with the UE, adjustment of the offset within the periodic pattern based on a slot during which an acknowledgment message is transmitted or received.

26. The method of claim 25, in which the offset change command includes a reset code point.

27. The method of claim 16, further comprising forbidding a transmission of a request for the offset change command until a prohibit timer expires.

28. The method of claim 27, further comprising transmitting an indication to disable the prohibit timer.

29. The method of claim 16, further comprising:
   transmitting, to the UE, a set of radio resources via radio resource control (RRC) signaling, the set of radio resources comprising a plurality of sets, one set for each of a plurality of channels; and
   transmitting, via the MAC-CE, an indication to activate one of the set of radio resources.

30. An apparatus of a UE for wireless communication, comprising:
   a memory; and
   at least one processor coupled to the memory and configured:
      to receive a periodic pattern configuration to enable communication with a base station for sending and/or receiving periodic traffic in accordance with the periodic pattern, the configuration comprising a period and an offset within the period;
      to receive, from the base station, a medium access control-control element (MAC-CE) including an offset change command; and
      to adjust the offset within the period based on the offset change command.

* * * * *